Patented May 15, 1951

2,552,696

UNITED STATES PATENT OFFICE 2,552,696

SEPARATION OF THE OPTICAL ISOMERS OF CERTAIN X-RAY CONTRAST AGENTS

Benjamin F. Tullar, East Greenbush, and James O. Hoppe, Albany, N. Y., assignors to Sterling Drug Inc., New York, N. Y., a corporation of Delaware No Drawing. Application February 26, 1949, Serial No. 78,676

8 Claims. (Cl. 260—520)

This invention relates to separation of the optical isomers of certain X-ray contrast agents.

The optically active beta-(3,5-diiodo-4-hydroxyphenyl)-alpha-phenylpropionic acids are useful as X-ray contrast agents, particularly for cholecystography.

The direct approach to these compounds lies through resolution of the optically inactive form of beta-(3,5-diiodo-4-hydroxyphenyl)-alpha-phenylpropionic acid. This could not be accomplished although a number of optically active bases and a variety of solvents were tried. In all cases the salts were extremely soluble and could be separated only as gums.

However, it has been found that resolution of the corresponding uniodinated acid, beta-(4-hydroxyphenyl)-alpha-phenylpropionic acid, can be effected through fractionation of its diastereoisomeric salts with quinine, whereafter the separated optically active forms of beta-(4-hydroxyphenyl)-alpha-phenylpropionic acid can be iodinated to give the desired optically active forms of beta-(3,5-diiodo-4-hydroxyphenyl)-alpha-phenylpropionic acid.

The diastereoisomeric salt mixture derived from optically inactive beta-(4-hydroxyphenyl)-alpha-phenylpropionic acid and quinine can be prepared by any methods applicable to the preparation of an amine salt of an acid. The salt mixture can be prepared directly in solution by dissolving approximately equivalent quantities of the acid and quinine in a suitable organic solvent. Conveniently the suitable organic solvent may be chosen in such relative quantity to dissolve the acid and quinine when hot and to allow gradual crystallization of the salts when cool. Alternatively, an aqueous solution of a metallic salt of the acid, for example the sodium salt, can be caused to react with an aqueous solution of a simple acid addition salt of quinine, for example the hydrochloride. Metathesis takes place and the sparingly soluble mixture of diastereoisomeric salts precipitates and may be collected by filtration and fractionally crystallized from a suitable organic solvent. A preferred method of producing this diastereoisomeric salt mixture and separating it by fractional crystallization is described as follows.

Fractional crystallization of the solution obtained by dissolving approximately equivalent amounts of beta-(4-hydroxyphenyl)-alpha-phenylpropionic acid and quinine in a suitable organic solvent brings about a separation of the two diastereoisomers, the salt of dextro-beta-(4-hydroxyphenyl)-alpha-phenylpropionic acid and quinine and the salt of levo-beta-(4-hydroxyphenyl)-alpha-phenylpropionic acid and quinine. Suitable organic solvents for this purpose include volatile neutral solvents having a boiling point between about 40° C. and 120° C., such as methylene dichloride, chloroform, ethyl acetate and lower aliphatic alcohols and ketones. When an acetone solution containing about 2.5% by weight of the starting acid is used, the first crop of crystals obtained at room temperature contains all of the dextro-acid-levo-base, which has the lesser solubility, and a small fraction of the levo-acid-levo-base. Recrystallization of this crop from 95% alcohol gives the pure dextro-acid-levo-base. When the mother liquors from the first crop of crystals are concentrated, the pure levo-acid-levo-base is obtained.

The two diastereoisomeric salts are then converted separately to the free optically active acids. This may be accomplished by acidification of an aqueous solution of one of the salts with a strong acid. This causes the free acid to precipitate and the quinine is retained in solution as an acid addition salt. A modification of this procedure involves treating one of the salts with a dilute aqueous alkaline solution, conveniently sodium hydroxide solution, followed by extraction with an immiscible organic solvent, conveniently ether. The alkaline solution converts the salt to the sodium salt of the optically active acid and liberates the quinine. Extraction with the organic solvent removes the quinine, leaving the sodium salt of the optically active acid in the aqueous solution. Acidification of the aqueous solution then causes separation of the free optically active acid. Accordingly, the dextro-acid-levo-base and the levo-acid-levo-base are converted respectively to dextro-beta-(4-hydroxyphenyl)-alpha-phenylpropionic acid and levo-beta-(4-hydroxyphenyl)-alpha-phenylpropionic acid.

Finally both optically active acids are iodinated using an iodinating agent such as free iodine or iodine monochloride. A preferred method involves treating the optically active acid with a solution of iodine dissolved in a solution of potassium iodide and sodium hydroxide. Acidification brings about separation of the 3,5-diiodo-derivative of the optically active acid. In this way dextro-beta-(4-hydroxyphenyl)-alpha-phenylpropionic acid is converted to dextro-beta-(3,5-diiodo-4-hydroxyphenyl)-alpha-phenylpropionic acid, and levo-beta-(4-hydroxyphenyl)-alpha-phenylpropionic acid is converted to levo-beta - (3,5 - diiodo - 4 - hydroxyphenyl) - alpha-phenylpropionic acid.

The iodinated acid as obtained by acidification of the iodination mixture is rather highly colored and is best purified by recrystallization of its salt with an organic base, such as dl-desoxyephedrine, ethanolamine, diethanolamine, etc. A preferred method comprises recrystallization of its dimethylaminoethanol salt from alcohol. The pure acid is then obtained by acidification of a solution of the pure dimethylaminoethanol salt. The dextro and levo iodinated acids crystallize with water of hydration.

Dextro- and levo-beta-(3,5-diiodo--4-hydroxyphenyl)-alpha-phenylpropionic acid are conveniently used in the form of water-soluble salts with non-toxic bases. Appropriate bases include the alkali metal hydroxides, ammonium hydroxide and various organic amines, especially hydroxyamines. Strong bases such as the alkali metal hydroxides will form di-salts through neutralization of both the carboxyl group and the phenolic group. The weaker bases, such as ammonium hydroxide and the amines, will form mono-salts by neutralization of the carboxyl group only. Examples of useful salts include the disodium salt, dipotassium salt, ammonium salt, ethanolamine salt, diethanolamine salt, triethanolamine salt, dimethylaminoethanol salt, etc.

The following example will illustrate this invention more fully.

EXAMPLE (A) *Salt of dextro-beta-(4-hydroxyphenyl)-alpha-phenylpropionic acid with quinine*

Beta-(4 - hydroxyphenyl) - alpha - phenylpropionic acid (24 g.) and 37 g. of quinine were dissolved in one liter of acetone. Crystallization was initiated by scratching and the solution was allowed to deposit a heavy crop of crystals over a period of 30 minutes at 25° C. The crystals were collected by filtration, washed with acetone and dried in air to give 38 g. of crude dextro-acid-levo-base, having the M. P. 200–203° C. after preliminary softening at 180° C. Recrystallization from 600 ml. of 95% alcohol gave 21 g. of the salt of dextro-beta-(4-hydroxyphenyl)-alpha-phenylpropionic acid with quinine, M. P. 210–212° C. By concentration, cooling and recrystallization, a second crop of 4 g., having the same M. P. was obtained to give a total yield of 81%. Further recrystallization did not change this melting point.

(B) *Salt of levo-beta-(4-hydroxyphenyl)-alpha-phenylpropionic acid with quinine*

When the initial filtrate from part A was concentrated to a volume of 150 ml. and cooled for about 15 hours at 5° C., 19 g. of the salt of levo-beta-(4-hydroxyphenyl)-alpha-phenylpropionic acid with quinine, M. P. 188–190° C. was obtained. Recrystallization from isopropyl alcohol did not change this melting point.

(C) *Dextro-beta - (4 - hydroxyphenyl) - alpha-phenylpropionic acid*

The pure salt of dextro-beta-(4-hydroxyphenyl)-alpha-phenylpropionic acid with quinine (part A) was shaken with 300 ml. of 10% sodium hydroxide solution and 300 ml. of ether until all dissolved and two clear phases resulted. The aqueous layer was separated, extracted with 100 ml. of ether and made acid to Congo red at 90° C. with hydrochloric acid. The solid which separated was collected by filtration at room temperature and washed with a small amount of hot water. Thus was obtained 9.8 g. (92%) of dextro-beta-(4-hydroxyphenyl)-alpha-phenylpropionic acid, M. P. 201–202° C.; $[\alpha]_D^{25°}$ (1.5% in 95% alcohol) = +111°; neutral equivalent = 240 (mol. wt. = 242).

(D) *Levo-beta-(4-hydroxyphenyl)-alpha-phenylpropionic acid*

Levo-beta-(4-hydroxyphenyl)-alpha-phenylpropionic acid was prepared from the salt of levo-beta-(4-hydroxyphenyl)-alpha-phenylpropionic acid with quinine (part B) by the method described in part C for the dextro-acid. The levo-acid had the M. P. 201–202° C.; $[\alpha]_D^{25°}$ (1.5% in 95% alcohol) = −111°; neutral equivalent = 240 (mol. wt. = 242).

(E) *Dextro-beta-(3,5-diiodo-4-hydroxy) - alpha-phenylpropionic acid*

Dextro-beta-(4-hydroxyphenyl)-alpha-phenylpropionic acid (part C) (24 g.) was dissolved in 630 ml. of water containing 8.0 g. of sodium hydroxide, and, with good stirring at 25° C., 51 g. of iodine and 51 g. of potassium iodide dissolved in 240 ml. of water was added dropwise over a period of 30 minutes. During this period another 8 g. of sodium hydroxide dissolved in 60 ml. of water was added in order to keep the reaction mixture alkaline to phenolphthalein. Stirring was continued for 15 minutes longer. The resulting solution was made acid to Congo red with concentrated hydrochloric acid, and about 5 g. of sodium bisulfite was added to partially decolorize the resulting slurry. The solid was collected by filtration and washed well with water.

The crude iodinated acid was then dissolved in 500 ml. of 95% alcohol, 10 g. of dimethylaminoethanol was added, the solution was decolorized with activated charcoal and filtered at 70° C. After keeping the filtrate for several hours at 5° C., the heavy crystalline precipitate which formed was collected by filtration and washed with acetone. The mother liquors were concentrated to 150 ml. and cooled to give a second crop which was further purified by recrystallization from 50 ml. of 95% alcohol. In this way a total of 36.0 g. of dimethylaminoethanol salt of dextro-beta-(3,5-diiodo-4-hydroxy)-alpha-phenylpropionic acid, M. P. 151–153° C., was obtained. The melting point of the dimethylaminoethanol salt of unresolved beta-(3,5-diiodo-4-hydroxy) - alpha - phenylpropionic acid was 142–144° C.

The pure dimethylaminoethanol salt was dissolved in 400 ml. of 50% acetic acid at 90° C., and then cooled to 5° C. The solid which precipitated was collected by filtration, washed with water, cold 50% acetic acid and finally with low-boiling petroleum ether. After drying in vacuo there was obtained 24 g. of hydrated dextro-beta-(3,5-diiodo - 4 - hydroxy) - alpha - phenylpropionic acid, M. P. 80–85° C.; $[\alpha]_D^{25°}$ (1.5% in 95% alcohol) = +59°.

*Anal.*—Iodine: Calc., 51.37. Found, 50.90; $H_2O_{KF} = 2.06$.

The disodium salt of dextro-beta-(3,5-diiodo-4-hydroxy)-alpha-phenylpropionic acid was prepared as follows: 11 g. of dextro-beta-(3,5-diiodo-4-hydroxy)-alpha-phenylpropionic acid hydrate was dissolved in 50 ml. of absolute alcohol, and slightly more than two equivalents of sodium hydroxide in the form of an 8% aqueous solution was added. Acetone (about two volumes) was added until turbidity persisted and crystallization was initiated by scratching. The mixture was then diluted slowly with 500 ml. of acetone and cooled to 5° C. for several hours. The solid which precipitated was collected by filtration, washed with acetone and ether, and dried in vacuo over anhydrous calcium chloride. This gave 11 g. of the disodium salt of the dextro-acid, melting with decomposition above 230° C.; $[\alpha]_D^{26°}$ (1.5% in water) = +56.6°.

*Anal.*—Calc. for $C_{15}H_{10}O_3I_2Na_2$: I, 47.21; Na, 8.54. Found: I, 47.48; Na, 8.38.

(F) *Levo-beta-(3,5-diiodo-4-hydroxy)-alpha-phenylpropionic acid*

Levo-beta-(3,5-diiodo-4-hydroxy)-alpha-phenylpropionic acid (part D) was prepared by iodination of levo-beta-(4-hydroxyphenyl)-alpha-phenylpropionic acid by the method described in part E for the dextro-acid. After drying at 60° C. (2 mm.) for four hours, the hydrated acid had the following characteristics: M. P. = 80–90° C.; $[\alpha]_D^{25°}$ (1.5% in 95% alcohol) = −59.5°.

*Anal.*—Iodine: Calc., 51.37. Found, 51.25; $H_2O_{KF}$ = 1.33%.

The dimethylaminoethanol salt of levo-beta-(3,5-diiodo-4-hydroxy)-alpha-phenylpropionic acid had the same melting point as the corresponding dextro salt, 151–153° C.

The disodium salt of levo-beta-(3,5-diiodo-4-hydroxy)-alpha-phenylpropionic acid, prepared by the method described in part E for the corresponding dextro salt, had the following properties: $[\alpha]_D^{30°}$ (1.5% in water) = −56.9°.

*Anal.*—Calc. for $C_{15}H_{10}O_3I_2Na_2$: I, 47.21; Na, 8.54. Found: I, 46.50; Na, 8.39.

We claim:

1. A method for preparing an optically active beta-(3,5-diiodo-4-hydroxy)-alpha-phenylpropionic acid which comprises isolating one of the diastereoisomeric salts of beta-(4-hydroxyphenyl)-alpha-phenylpropionic acid with quinine by fractional crystallization of an approximately equimolecular mixture of the two diastereoisomeric salts from a neutral organic solvent of boiling point between about 40° C. and 120° C., converting said diastereoisomeric salt to the corresponding optically active beta-(4-hydroxyphenyl)-alpha-phenylpropionic acid, and iodinating said acid.

2. A method of preparing dextro-beta-(3,5-diiodo-4-hydroxy)-alpha-phenylpropionic acid which comprises isolating the salt of dextro-beta-(4-hydroxyphenyl)-alpha-phenylpropionic acid with quinine by fractional crystallization of an approximately equimolecular mixture of the two diastereoisomeric salts from a neutral organic solvent of boiling point between about 40° C. and 120° C., converting said diastereoisomeric salt to dextro-beta-(4-hydroxyphenyl)-alpha-phenylpropionic acid, and iodinating said acid.

3. A method of preparing levo-beta-(3,5-diiodo-4-hydroxy)-alpha-phenylpropionic acid which comprises isolating the salt of levo-beta-(4-hydroxyphenyl)-alpha-phenylpropionic acid with quinine by fractional crystallization of an approximately equimolecular mixture of the two diastereoisomeric salts from a neutral organic solvent of boiling point between about 40° C. and 120° C., converting said diastereoisomeric salt to levo-beta-(4-hydroxyphenyl)-alpha-phenylpropionic acid, and iodinating said acid.

4. In the method of preparing an optically active beta-(3,5-diiodo-4-hydroxy)-alpha-phenylpropionic acid, the step which comprises isolating one of the diastereoisomeric salts of beta-(4-hydroxyphenyl)-alpha-phenylpropionic acid with quinine by fractional crystallization of an approximately equimolecular mixture of the two diastereoisomeric salts from a neutral organic solvent of boiling point between about 40° C. and 120° C.

5. In the method of preparing dextro-beta-(3,5-diiodo-4-hydroxy)-alpha-phenylpropionic acid, the step which comprises isolating the salt of dextro-beta-(4-hydroxyphenyl)-alpha-phenylpropionic acid with quinine by fractional crystallization of an approximately equimolecular mixture of the two diastereoisomeric salts from a neutral organic solvent of boiling point between about 40° C. and 120° C.

6. In the method of preparing levo-beta-(3,5-diiodo-4-hydroxy)-alpha-phenylpropionic acid, the step which comprises isolating the salt of levo-beta-(4-hydroxyphenyl)-alpha-phenylpropionic acid with quinine by fractional crystallization of an approximately equimolecular mixture of the two diastereoisomeric salts from a neutral organic solvent of boiling point between about 40° C. and 120° C.

7. The process according to claim 5 in which the neutral organic solvent is acetone.

8. The process according to claim 6 in which the neutral organic solvent is acetone.

BENJAMIN F. TULLAR.
JAMES O. HOPPE.

REFERENCES CITED

The following references are of record in the file of this patent:

UNITED STATES PATENTS

| Number | Name | Date |
| --- | --- | --- |
| 334,290 | Schmitt | Jan. 12, 1886 |
| 407,906 | Seifert | July 30, 1889 |
| 1,937,477 | Mills et al. | Nov. 28, 1933 |
| 2,345,384 | Dohrn et al. | Mar. 28, 1944 |
| 2,400,433 | Natelson et al. | May 14, 1946 |

FOREIGN PATENTS

| Number | Country | Date |
| --- | --- | --- |
| 559,024 | Great Britain | Feb. 1, 1944 |

OTHER REFERENCES

Karrer: 'Organic Chem.' (Nordeman, 1938), pp. 91–93.